United States Patent
Izumiya et al.

(10) Patent No.: US 6,839,078 B2
(45) Date of Patent: Jan. 4, 2005

(54) IMAGE FORMING APPARATUS WHICH CHANGES CLOCK FREQUENCIES IN ACCORDANCE WITH RECORDING SHEET SHRINKAGE

(75) Inventors: Kenji Izumiya, Hachioji (JP); Hiroyuki Maruyama, Kanagawa (JP); Toshihiro Motoi, Tokyo (JP); Ryuji Okutomi, Hino (JP); Shinobu Kishi, Hachioji (JP); Satoshi Ogata, Hachioji (JP); Eiji Nishikawa, Hachioji (JP); Tadayuki Ueda, Kokubunji (JP); Yumiko Higashi, Kokubunji (JP)

(73) Assignee: Konica Corporation, Tokyo (JP)

(*) Notice: Subject to any disclaimer, the term of this patent is extended or adjusted under 35 U.S.C. 154(b) by 1 day.

(21) Appl. No.: 10/378,801

(22) Filed: Mar. 4, 2003

(65) Prior Publication Data

US 2003/0174200 A1 Sep. 18, 2003

(30) Foreign Application Priority Data

Mar. 12, 2002 (JP) .................................. 2002-067274

(51) Int. Cl.[7] .......................... B41J 2/435; B41J 2/47
(52) U.S. Cl. ........................... 347/249; 347/252
(58) Field of Search .............................. 347/237, 247, 347/249, 252, 234, 235, 248, 250; 358/1.2, 1.9; 399/301

(56) References Cited

U.S. PATENT DOCUMENTS 6,219,516 B1 * 4/2001 Furst et al. .................. 399/301
6,628,424 B2 * 9/2003 Sakurai ....................... 358/1.9
6,667,756 B2 * 12/2003 Conrow et al. ............. 347/248

* cited by examiner

Primary Examiner—Hai Pham
(74) Attorney, Agent, or Firm—Frishauf, Holtz, Goodman & Chick, P.C.

(57) ABSTRACT

There is described a duplex image-forming apparatus having a function of forming images onto both sides of a transfer material. The apparatus includes an image-forming section to respectively form an obverse-side image and a reverse-side image on a photoreceptor element by scanning a light beam, modulated with image signals based on pixel-clock signals and reflected from a polygon mirror rotating at an operating velocity based on polygon-clock signals; a transferring section to transfer said obverse-side image and said reverse-side image onto both surfaces of said recording sheet; a fixing section to fix the images onto both surfaces of said recording sheet; and a clock-frequency changing section to change a pixel-clock frequency, and a polygon-clock frequency, corresponding to a degree of shrinkage of said recording sheet caused by a fixing operation performed in said fixing section, at a transition time of an image-forming operation from one side to another side.

13 Claims, 9 Drawing Sheets

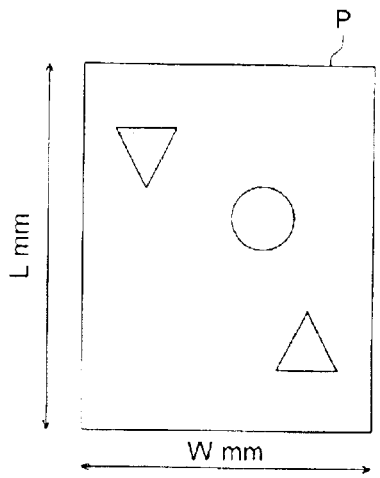
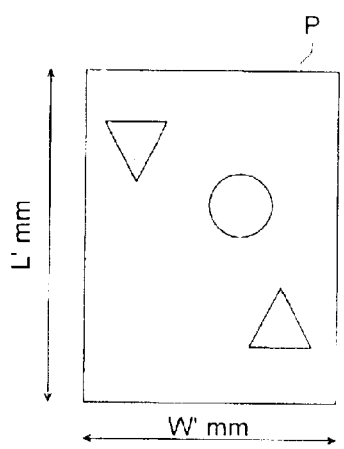

AFTER FIXING →

* IF THE IMAGE ON THE BACK SIDE IS NOT FORMED ACCORDING TO THIS SIZE, MISREGISTRATION WILL OCCUR BETWEEN THE FRONT AND BACK

POLYGON DRIVE CLOCK FREQUENCY $\quad F = \dfrac{L}{L'} \cdot F_0$

PIXEL CLOCK FREQUENCY $\quad f = \dfrac{L}{L'} \cdot \dfrac{W}{W'} \cdot f_0$ $F_0$ : POLYGON DRIVE CLOCK FREQUENCY FOR IMAGE FORMATION ON THE FRONT $F$ : POLYGON DRIVE CLOCK FREQUENCY FOR IMAGE FORMATION ON THE BACK $f_0$ : PIXEL CLOCK FREQUENCY FOR IMAGE FORMATION ON THE FRONT $f$ : PIXEL CLOCK FREQUENCY FOR IMAGE FORMATION ON THE BACK

IMAGE FORMING APPARATUS WHICH CHANGES CLOCK FREQUENCIES IN ACCORDANCE WITH RECORDING SHEET SHRINKAGE

BACKGROUND OF THE INVENTION

The present invention relates to an image-forming apparatus and specifically relates to a duplex image-forming apparatus having a function of forming images onto both sides of a transfer material (a recording sheet).

In an image-forming apparatus, such as a laser printer, etc., a printing operation is performed through the processes of exposing, developing, transferring and fixing. Concretely speaking, initially, a latent image to be printed is formed on a surface of a photoreceptor drum by irradiating a light beam (a laser beam), which is modulated on the basis of the image data, onto the photoreceptor drum, and then, the developing device develops the latent image with toner. The developed toner image is transferred onto the transfer material (the recording sheet), and then, the fixing device fixes the toner image onto the transfer material. As a result, the image is formed on the transfer material.

When fixing the toner image onto the transfer material, the transfer material tends to shrink, since the fixing heat dehydrates the transfer material during the fixing operation. Specifically, when performing the duplex printing, the shrinkage of the transfer material, generated during the fixing operation for the obverse surface of the transfer material, causes a misregistration error between obverse and reverse images, since the obverse image size becomes different from the reverse image size. To cope with this problem, it has been possible to adjust the magnification factor in a sheet feeding direction by changing the processing velocity between the obverse image forming operation and the reverse image forming operation.

It has been a problem, however, that the abovementioned method, for adjusting the magnification factor by changing the processing velocity, cannot be applied for adjusting the magnification factor in a width direction of the transfer material, though it is applicable for adjusting the magnification factor in a sheet feeding direction (a lateral direction of the transfer material). Especially in a color image-forming apparatus having a plurality of image-forming units each of which includes an exposure unit, a photoreceptor drum, a developing device, etc., even if an image-forming operation, performed in one of the plurality of image-forming units, is completed, sometimes, another image-forming operation, performed in another one of the plurality of image-forming units, still continues, due to gaps arranged between the exposure units (process gaps). Therefore, the change of the processing velocity, before the image-forming operations in all of the plurality of image-forming units are completed, would result in a color misregistration error. To avoid the color misregistration error, the processing velocity should be changed after the image-forming operations in all of the plurality of image-forming units are completed. Accordingly, it has been a problem that the total printing time is getting long, resulting in a reduction of the print productivity.

SUMMARY OF THE INVENTION

To overcome the abovementioned drawbacks in conventional image-forming apparatus, it is an object of the present invention to provide a duplex image-forming apparatus, which makes it possible to accurately adjust the obverse and reverse image sizes without lowering the print productivity.

Accordingly, to overcome the cited shortcomings, the abovementioned object of the present invention can be attained by duplex image-forming apparatus described as follow.

(1) An apparatus for forming a duplex image on a recording sheet, the duplex image includes an obverse-side image formed on an obverse surface of the recording sheet and a reverse-side image formed on a reverse surface of the recording sheet, the apparatus comprising: an image-forming section to respectively form the obverse-side image and the reverse-side image on a photoreceptor element by scanning a light beam, modulated with image signals based on pixel-clock signals and reflected from a polygon mirror rotating at an operating velocity based on polygon-clock signals, onto the photoreceptor element; a transferring section to transfer the obverse-side image and the reverse-side image formed on the photoreceptor element onto the obverse surface and the reverse surface of the recording sheet, respectively; a fixing section to fix the obverse-side image and the reverse-side image onto the obverse surface and the reverse surface of the recording sheet, respectively; and a clock-frequency changing section to change a pixel-clock frequency, being a frequency of the pixel-clock signals, and a polygon-clock frequency, being a frequency of the polygon-clock signals, corresponding to a degree of shrinkage of the recording sheet caused by a fixing operation performed in the fixing section, at a transition time of an image-forming operation in the image-forming section from the obverse-side image to the reverse-side image, and vice versa.

(2) The apparatus of item 1, wherein the clock-frequency changing section determines a pixel-clock frequency changing-rate and a polygon-clock frequency changing-rate, based on a first shrinkage rate of the recording sheet in a paper conveying direction.

(3) The apparatus of item 2, wherein the clock-frequency changing section further determines the pixel-clock frequency changing-rate, based on both the first shrinkage rate of the recording sheet in a paper conveying direction and a second shrinkage rate of the recording sheet in a main-scanning direction.

(4) An apparatus for forming a duplex color image on a recording sheet, the duplex color image includes an obverse-side color image formed on an obverse surface of the recording sheet and a reverse-side color image formed on a reverse surface of the recording sheet, the apparatus comprising: a plurality of image-creating units, each of which corresponds to each of a plurality of unicolor images and forms each of the plurality of unicolor images by scanning a light beam, modulated with image signals based on pixel-clock signals and reflected from a polygon mirror rotating at an operating velocity based on polygon-clock signals, to respectively form the obverse-side color image and the reverse-side color image on a photoreceptor element; a transferring section to transfer the obverse-side color image and the reverse-side color image formed on the photoreceptor element onto the obverse surface and the reverse surface of the recording sheet, respectively; a fixing section to fix the obverse-side color image and the reverse-side color image onto the obverse surface and the reverse surface of the recording sheet, respectively; and a clock-frequency changing section to change a pixel-clock frequency, being a frequency of the pixel-clock signals for each of the plurality of image-creating units, and a polygon-clock frequency, being a frequency of the polygon-clock signals for each of the plurality of image-creating units, corresponding to a degree of shrinkage of the recording sheet caused by a fixing operation performed in the fixing section, at a transition time of an image-forming operation from the obverse-side color image to the reverse-side color image, and vice versa.

(5) The apparatus of item 4, wherein the clock-frequency changing section determines a pixel-clock frequency changing-rate and a polygon-clock frequency changing-rate, based on a first shrinkage rate of the recording sheet in a paper conveying direction.

(6) The apparatus of item 5, wherein the clock-frequency changing section further determines the pixel-clock frequency changing-rate, based on both the first shrinkage rate of the recording sheet in a paper conveying direction and a second shrinkage rate of the recording sheet in a main-scanning direction.

(7) The apparatus of item 5, further comprising: a setting section to set timings for forming the plurality of unicolor images separately between a first phase for forming the obverse-side color image and a second phase for forming the reverse-side color image, based on the pixel-clock frequency changing-rate and the polygon-clock frequency changing-rate determined by the clock-frequency changing section.

(8) The apparatus of item 4, wherein the clock-frequency changing section changes the pixel-clock frequency and the polygon-clock frequency separately for every one of the plurality of image-creating units.

(9) The apparatus of item 4, wherein each of polygon-clock signals, corresponding to each of the plurality of image-creating units, is generated from each of a plurality of clock generating sources being independent from each other.

(10) The apparatus of item 4, further comprising: a multi-clock generating section to generate a plurality of clock signals, each of which is independently employed for each of the plurality of image-creating units, from a clock signal outputted by a single clock generating source; wherein each of polygon-clock signals, corresponding to each of the plurality of image-creating units, is generated from each of the plurality of clock signals generated by the multi-clock generating section.

(11) The apparatus of item 4, further comprising: a reference signal detecting section to detect main-scanning reference signals in main-scanning paths of the light beam; and a phase controlling section to control a phase of the polygon-clock signals, based on a phase difference between a first main-scanning reference signal of a reference color and a second main-scanning reference signal of another color, so as to determine the phase of the polygon-clock signals corresponding to the second main-scanning reference signal of the other color, each of the first and second main-scanning reference signals being one of the main-scanning reference signals detected by the reference signal detecting section.

(12) The apparatus of item 11, wherein the phase controlling section independently performs a first operation for controlling the phase of the polygon-clock signals employed for forming the obverse-side color image on the obverse surface of the recording sheet, and a second operation for controlling the phase of the polygon-clock signals employed for forming the reverse-side color image on the reverse surface of the recording sheet; and wherein the phase controlling section changes the first operation to the second operation every time when the first operation for each of the plurality of unicolor images is completed, or vise versa.

(13) The apparatus of item 11, wherein the phase controlling section independently performs a first operation for controlling the phase of the polygon-clock signals employed for forming the obverse-side color image on the obverse surface of the recording sheet, and a second operation for controlling the phase of the polygon-clock signals employed for forming the reverse-side color image on the, reverse surface of the recording sheet; and wherein the phase controlling section changes the first operation to the second operation when the first operation for all of the plurality of unicolor images is completed, and vice versa.

Further, to overcome the abovementioned problems, other image forming apparatus, embodied in the present invention, will be described as follow:

(14) An image forming apparatus, characterized in that,
in the image forming apparatus, which is provided with image forming means for scanning a light beam on a photoreceptor element using a polygon mirror to form an image, transfer means for transferring onto recording paper the image formed by this image forming means, and fixing means for fixing the aforementioned transferred image onto this recording paper, and has a duplex printing function, the image forming apparatus is further provided with a change means for changing the frequency of pixel clock signals for driving the aforementioned light beam and the frequency of polygon clock signals for driving the aforementioned polygon mirror, based on the degree of the shrinkage of the recording paper caused by the fixing means in the process of shifting from image formation on one side by the aforementioned image forming means to image formation on the other side by the image forming means.

(15) An image forming apparatus, characterized in that,
in the image forming apparatus, which is provided with image forming means further containing multi-color image creating units for image formation, the aforementioned image forming means being a device for scanning a light beam on a photoreceptor element using a polygon mirror for each of these image creating units to form an image, transfer means for transferring onto recording paper the image formed by the aforementioned multi-color image creating units and fixing means for fixing the aforementioned transferred image onto this recording paper, and has a duplex printing function, the image forming apparatus is further provided with a change means for changing the frequency of pixel clock signals for driving the aforementioned light beam of the aforementioned image creating units and the frequency of polygon clock signals for driving the aforementioned polygon mirror, based on the degree of the shrinkage of the recording paper caused by the fixing means in the process of shifting from image formation on one side by the aforementioned image forming means to image formation on the other side by the image forming means.

(16) The image forming apparatus, described in item 14 or 15, characterized in that the aforementioned change means determines the change rate of the frequency of the aforementioned pixel clock signals and the frequency of polygon clock signals based on the shrinkage rate of the recording paper in the feed direction.

(17) The image forming apparatus, described in item 16, characterized in that the aforementioned change means determines the change rate of the aforementioned pixel clock signals based on the shrinkage rates of the recording paper in the feed direction and in the main scanning direction of the recording paper.

The aforesaid invention allows frequencies of the pixel clock signal and polygon clock signal to be changed when image formation on one side of the recording paper is shifted to that on the other side, thereby ensuring excellent matching between the image size of the front side and that of the back side.

(18) The image forming apparatus, described in item 16 or 17, characterized in that the image forming apparatus is further provided with a setting means for setting the timings of forming images of various colors separately between front surface image formation and back surface image formation, based on the change rate determined by the aforementioned change means.

The aforementioned invention allows the timings of forming images of various colors to be set separately between formation of an image on the front surface and that on the back surface. This prevents color misregistration from occurring in the traveling direction of paper.

(19) The image forming apparatus, described in anyone of items 15–18, characterized in that the aforementioned change means changes the frequency of pixel clock signals and the frequency of polygon clock signals for each of the aforementioned multi-color image creating units.

The aforementioned invention allows the frequency of pixel clock signals and that of polygon clock signals to be changed for each of the aforementioned multi-color image creating units, whereby printing time is reduced.

(20) The image forming apparatus, described in anyone of items 15–19, characterized in that each of polygon clock signals corresponding to each of the aforementioned image creating units is generated by each of clock signal sources being different from each other.

The aforementioned invention provides easy generation of a polygon clock signal corresponding to each of the image creating units.

(21) The image forming apparatus, described in anyone of items 15–19, characterized in that the image forming apparatus is further provided with clock generation means that separately generates clock signals used in each of the image creating units, from the clock signals produced from one clock signal source, and polygon clock signals corresponding to the image creating units are each produced from clock signals generated from the aforementioned clock generation means.

The above invention provides high-precision correction of color misregistration, since polygon clock signals corresponding to the image creating units are each produced from one clock generation means.

(22) The image forming apparatus, described in anyone of items 15–19, characterized in that the image forming apparatus is further provided with detecting means for detecting the main scanning reference signal in the light beam in the aforementioned multi-color image creating units, and phase control means for controlling the phase of this polygon clock signal, based on the phase difference between the main scanning reference signal detected by the aforementioned detecting means and the polygon clock signal.

(23) The image forming apparatus, described in items 22, characterized in that the aforementioned phase control means provides phase control of the polygon clock signal corresponding to image formation on the front surface of the recording paper, and that on the back surface of the paper, where these two types of control are provided independently of each other, and, upon completion of phase control of one side of the recording paper, phase control of the other side of the paper is started for each color.

(24) The image forming apparatus, described in items 23, characterized in that, upon completion of entire phase control corresponding to image formation on one side of the recording paper, the aforementioned phase control means is switched over to phase control corresponding to that on the other-side of the recording paper, for each color.

The invention described above provides polygon signal phase control, thereby enabling correction of color misregistration of not more than one pixel in the paper feed direction.

BRIEF DESCRIPTION OF THE DRAWINGS

Other objects and advantages of the present invention will become apparent upon reading the following detailed description and upon reference to the drawings in which:

FIGS. 3(a) and 3(b) are drawings representing the shrinkage of transfer material (recording paper) due to fixing operation;

FIG. 4 is a block diagram representing a polygon drive clock generation circuit 105a;

DETAILED DESCRIPTION OF THE PREFERRED EMBODIMENT

Figure 1:
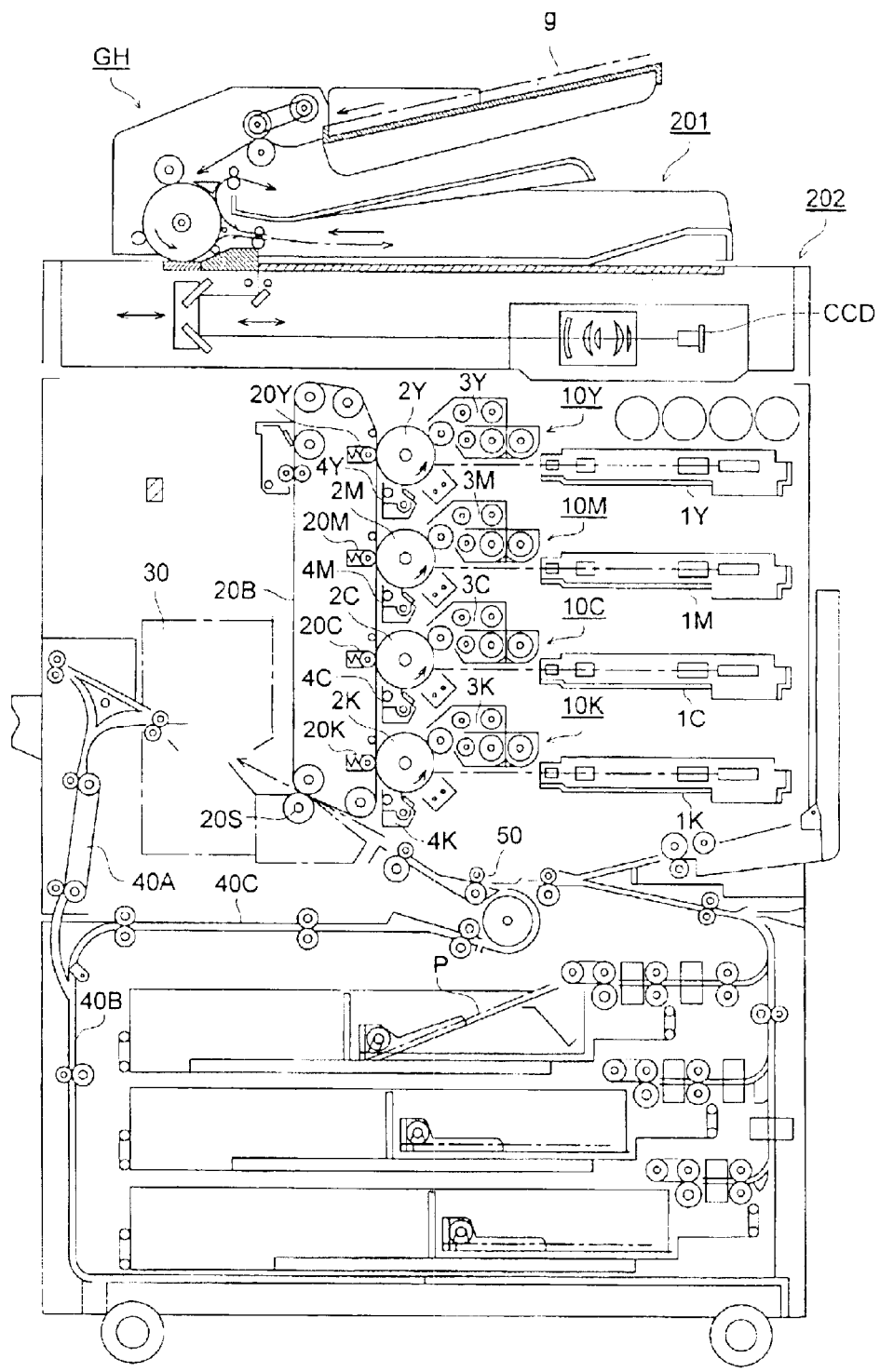
FIG. 1 is a cross sectional view representing the image forming apparatus GH according to the present invention.

Referring to the drawings, an image-forming apparatus, embodied in the present invention, will be detailed in the following.

FIG. 1 shows a cross-sectional view of an image forming apparatus GH, such as a color copier, etc., embodied in the present invention. As shown in FIG. 1, the image forming apparatus GH comprises a plurality of image forming units 10Y, 10M, 10C, 10K, a transferring section 20, a fixing section 30, serving as a fixing means, and a paper conveying section 40 including a paper re-feeding mechanism (an ADU mechanism).

The image forming unit 10Y, for forming a toner image of yellow (Y) color, is provided with an exposure unit 1Y, a photoreceptor drum 2Y serving as an image-forming element, developing device 3Y, a photoreceptor cleaning device 4Y. In the exposure unit 1Y, a polygon mirror (not shown in the drawings) scans a light beam (a laser beam) onto the photoreceptor drum 2Y under the controlling actions embodied in the present invention (described later, referring to FIGS. 2–9). A scanning operation of the light beam irradiated onto photoreceptor drum 2Y forms a latent image on the surface of photoreceptor drum 2Y. The developing device 3Y develops the latent image formed on the photoreceptor drum 2Y with toner of Y (yellow) color.

The image forming section 10M, for forming a toner image of magenta (M) color, is provided with a exposure unit 1M, a photoreceptor drum 2M serving as an image-forming element, a developing device 3M, a photoreceptor cleaning device 4M. An image forming section 10C, for forming a toner image of cyan (C) color, is provided with the exposure unit 1C, a photoreceptor drum 2C serving as an image-forming element, a developing device 3C, a photoreceptor cleaning device 4C. An image forming section 10K, for forming a toner image of black (K) color, is provided with an exposure unit 1K, a photoreceptor drum 2K serving as an image-forming element, a developing device 3K, a photoreceptor cleaning device 4K. Accordingly, in each of image forming sections 10M, 10C, 10K, the image-forming operation is performed through the same processes as those in image-forming section 10Y.

In the transferring section 20, each of the Y, M, C, K color toner images, formed in each of the image-forming sections 10Y, 10M, 10C, 10K, is sequentially transferred onto an intermediate transferring belt 20B, rotating along photoreceptor drums 2Y, 2M, 2C, 2K, by means of primary transferring rollers 20Y, 20M, 20C, 20K, so as to form a full-color toner image by synthesizing the Y, M, C, K color toner images (the primary transferring operation). When a recording paper P is conveyed to a position of a secondary transferring roller 20S, the full-color toner image formed on the intermediate transferring belt 20B is transferred onto an obverse side of the recording paper P at a time by means of the secondary transferring roller 20S equipped in the transferring section 20 (the secondary transferring operation).

The full-color toner image transferred onto the recording paper P is fixed onto the recording paper P by the heat-fixing processing performed in the fixing section 30.

A paper conveying section 40 comprises a paper-circulating path 40A, a reverse conveying path 40B and a paper re-feeding section 40C. When forming a reverse image, the recording-paper P ejected from the fixing section 30 is passed through the paper-circulating path 40A, and then, when the recording-paper P arrives at the reverse conveying path 40B, the rotating direction of the rollers, equipped in the reverse conveying path 40B, is reversed so as to convey the recording-paper P to paper the re-feeding section 40C. Accordingly, at the time when the recording-paper P passes through paper the re-feeding section 40C, the obverse side, on which the full-color toner image is already fixed, faces upward. The recording paper P passed through the paper re-feeding section 40C is reversed in its obverse and reverse sides by paper the feeding roller 50, and is conveyed again by the secondary transferring roller 20S so as to transfer another full-color toner image onto another side (a reverse side) of the recording-paper P at a time.

Next, referring to FIG. 2-FIG. 7, a configuration of a controlling system for each of the exposure units 1Y, 1M, 1C, 1K will be detailed in the following. Although a controlling system of the exposure unit 1 is exemplified as a single unit in the following explanation referring to FIG. 2 in order to simplify the explanation, the following explanation will be applied for each of the exposure units 1Y, 1M, 1C, 1K.

Figure 2:
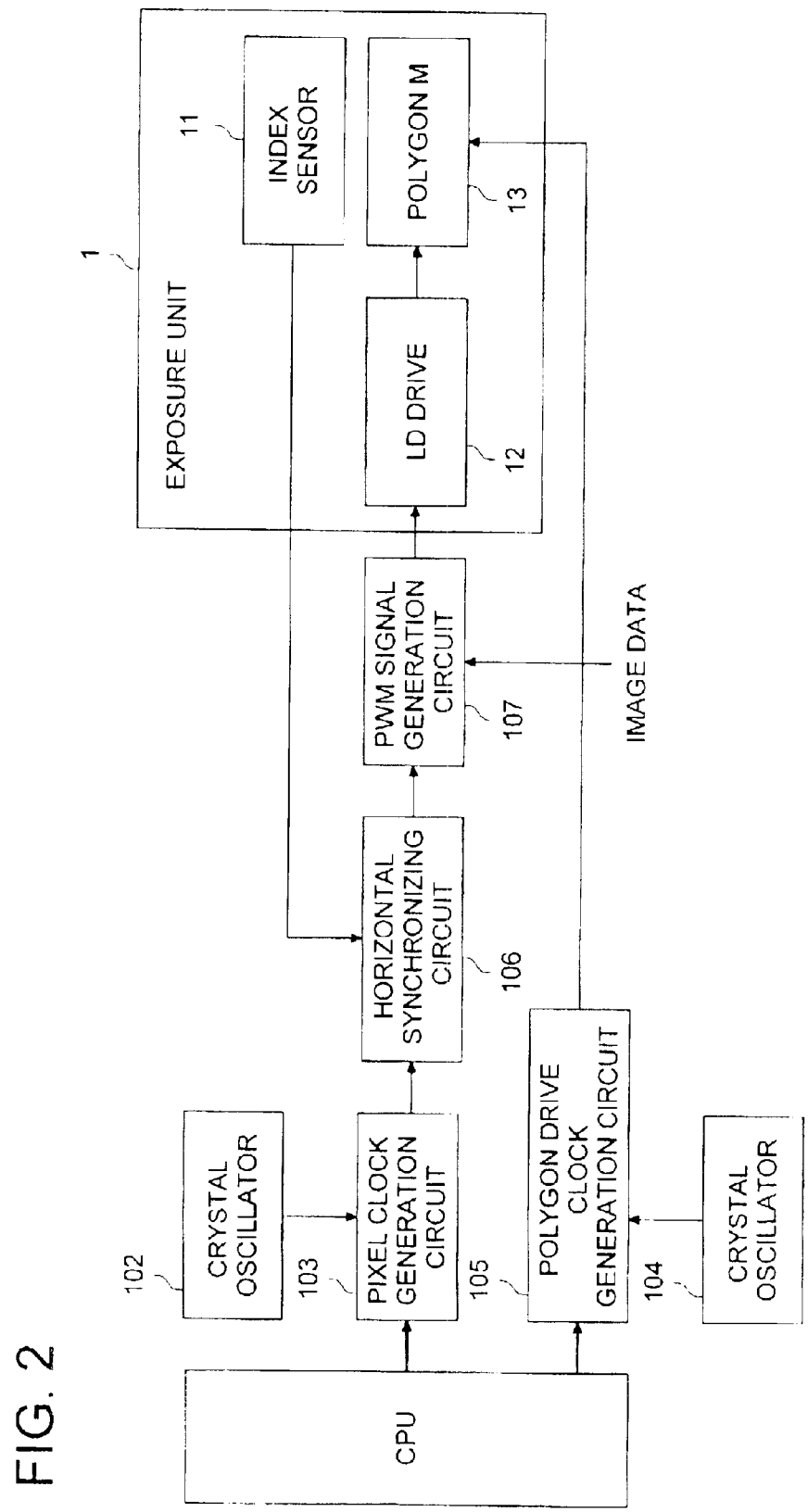
FIG. 2 is a block diagram representing the configuration of the control circuit of an exposure unit (1Y, 1M, 1C and 1K)

FIG. 2 shows a block diagram of the configuration of the controlling circuit for the exposure unit 1. As shown in FIG. 2, the controlling circuit for the exposure unit 1 comprises a CPU 101, a crystal oscillator 102, 104, a pixel clock generation circuit 103, a polygon drive clock generation circuit 105, a horizontal synchronizing circuit 106 and a PWM (Pulse Width Modulation) signal generation circuit 107. Further, the exposure unit 1 comprises an index sensor 11, a LD (Laser Diode) drive unit 12 and a polygon motor 13.

A CPU 101 provides various control operations according to the control program for image forming apparatus stored in a memory (not illustrated).

To put it more specifically, the CPU 101 changes the setting of the frequency value for the polygon drive clock signal (hereinafter referred to as "polygon drive clock signal frequency") in the creation of image on the back side, based on the degree of shrinkage of recording paper caused by fixing operation during printing on the front surface, in order to adjust the scale in paper feed direction during the creation of image on the back side. In this case, the CPU 101 separately changes the polygon drive clock frequency for each color, where the rate of change in the polygon drive clock frequency for each color remains the same. The CPU 101 sends to the polygon drive clock generation circuit the control signal for instructing generation of the polygon drive clock signal having an updated polygon drive clock frequency.

When the polygon drive clock frequency value has been increased by a change in polygon drive clock frequency, the polygon mirror speed is increased to raise the speed for main scanning of the laser beam on the photoreceptor drum by means of a polygon mirror (main scanning speed). In other words, the size of formed image is reduced if the main scanning speed is increased when process speed is constant, and is increased if the main scanning speed is reduced.

When the main scanning speed is changed by changing the polygon drive clock frequency described above, the scale in the direction of main scanning is also changed. Then in order to adjust the scale in the direction of main scanning, the CPU 101 changes the setting of the value for pixel clock signal frequency (hereinafter referred to as "pixel clock frequency") in image creation on the back side. Since shrinkage of the transfer material (recording paper) due to fixing operation also occurs in the direction of main scanning, the CPU 101 changes the settings of pixel clock frequency, including the resealing in the direction of main scanning due to shrinkage of the transfer material. In this case, the CPU 101 changes the pixel clock frequency of each color separately, where the rate of change in the pixel clock frequency for each color remains the same. The CPU 101 sends to the pixel clock generation circuit 103 the control signal for instructing generation of the pixel clock signal having an updated pixel clock frequency.

In this case, the following alternative configurations are also possible: (1) The degree of the shrinkage of the transfer material P is instructed manually by an operator from the control panel (not illustrated). (2) A document reader is used to provide automatic detection by reading the pattern for measuring the size of the image formed on the front and back sides of the transfer material. (3) Automatic detection is provided by the means for detecting the size of the image formed on the front and back sides of the transfer material inside the paper feed path.

As illustrated in FIG. 3, let assume, for example, that recording paper P before undergoing fixing operation has a longitudinal length (in paper feed direction) of L mm and a width (in the direction of main scanning) of W mm (FIG. 3 (a)), and the sizes are shrunken to L' mm and W' mm (FIG. 3 (b)) due to fixing on the surface of the recording paper P. Also assume that polygon drive clock frequency during image creation on the front side is F0, and that during image creation on the back side is F. Then we get F=(L/L') F0. Let us further assume that pixel clock frequency during image creation on the front side is f0 and that during image creation on the back side is f. Then we get: f=(L/L') (W/W') f0.

The CPU 101 changes the setting of polygon drive clock frequency separately for each color, where the rate of change (L/L') in the polygon drive clock frequency for each color remains the same. In the same manner, the CPU 101 changes the setting of pixel clock frequency separately for each color, where the rate of change (L/L') (W/W') in the pixel clock frequency for each color remains the same.

The CPU 101 adjusts the timing of image formation for each color by changing the color misregistration correction value corresponding to the correction value for inter-process gaps in response to the change in polygon drive clock frequency. This is because the number of lines corresponding to the inter-process gap is changed by adjusting the scale in the paper feed direction (sub-scanning direction) without changing the process speed. The inter-process gap is stored in the memory (not illustrated) as a color misregistration correction value. This color misregistration correction value is set in conformity to the formation of image on the front surface. When the image is formed on the back side by adjusting the scale in the sub-scanning direction, this color misregistration correction value must be changed in response to shrinkage rate (rate of change) in the sub-scanning direction; otherwise, color misregistration will occur. This makes it possible to use a different color misregistration correction value in the image creation on the front side from that in the image creation on the back side.

In FIG. 2, a crystal oscillator 102 generates a reference clock signal having a predetermined frequency and sends it to the pixel clock generation circuit 103.

In response to the control signal received from the CPU 101, the pixel clock generation circuit 103 generates a pixel clock signal for driving laser beam in the exposure unit 1, from the reference clock signal sent from the crystal oscillator 102.

A crystal oscillator 104 generates the reference clock signal having a predetermined frequency and sends it to a polygon drive clock generation circuit 105.

In response to the control signal received from the CPU 101, the polygon drive clock generation circuit 105 generates from the reference clock signal received from the crystal oscillator 104 the polygon drive clock signal for driving the polygon mirror for applying laser beam to a photoreceptor drum. The details of the polygon drive clock generation circuit 105 are described with reference to FIGS. 4 through 7.

A horizontal synchronizing circuit 106 synchronizes the pixel clock signal generated by the pixel clock generation circuit 103 with an index signal (described later) detected by an index sensor 11, and sends it to a PWM signal generation circuit.

In response to the pixel clock signal received from the horizontal synchronizing circuit 106, the PWM signal generation circuit 107 generates the PWM signal corresponding to image data and sends it to a LD drive unit 12.

The index sensor 11 in the exposure unit 1 uses an index mirror (not illustrated) to detect the main scanning reference signal (index signal) of laser beam irradiated from the polygon mirror and sends it to the horizontal synchronizing circuit 106.

Based on the PWM signal produced from the PWM signal generation circuit 107, a LD drive unit 12 generates the drive signal for controlling the LD.

The polygon M (motor) 13 is a DC brush-less motor for controlling LD irradiation according to the drive signal produced from the LD drive unit 12. It rotates and drives the polygon mirror in response to the polygon clock signal produced from the polygon drive clock generation circuit 105.

The following describes the polygon drive clock generation circuit 105 of FIG. 2.

Figure 4:
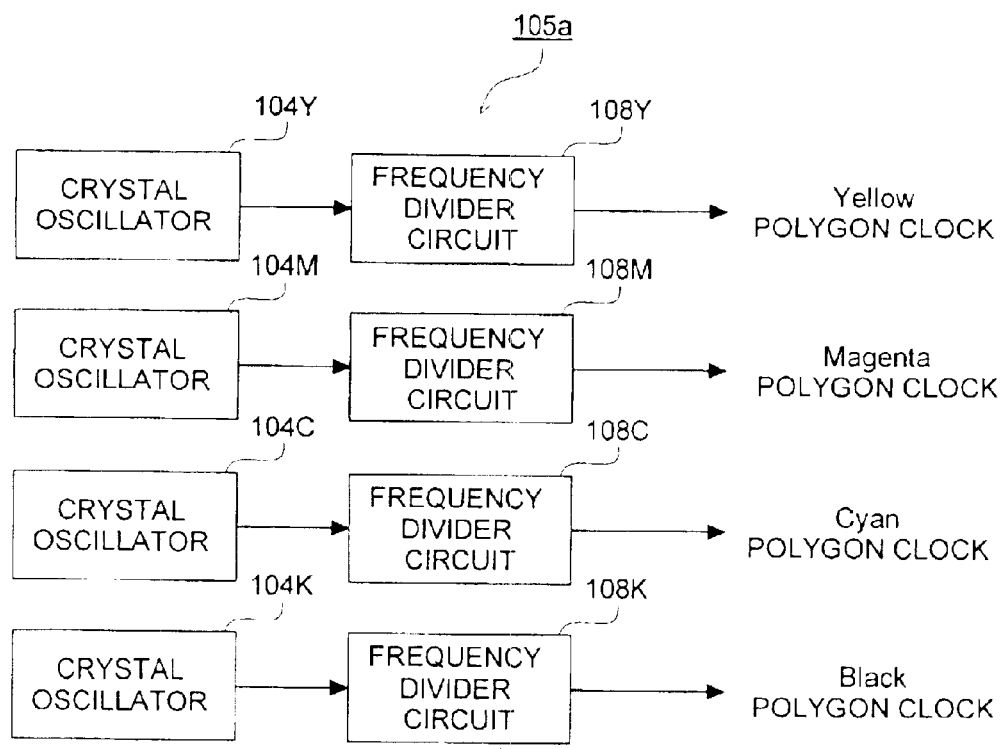

FIG. 4 shows the internal configuration of a polygon drive clock generation circuit 105a as an example of the polygon drive clock generation circuit 105 according to the present invention.

As shown in FIG. 4, the polygon drive clock generation circuit 105 comprises crystal oscillators 104Y, 104M, 104C and 104K, and frequency divider circuits 108Y, 108M, 108C and 108K.

The CPU 101 shown in FIG. 2 separately sets the division ratio of each of the frequency divider circuits 108Y, 108M, 108C and 108K, and sends to each of these frequency divider circuits the control signal for instructing frequency division at the preset division ratio. Especially, the CPU 101 changes the setting of division ratio in each frequency divider circuit in order to change the polygon drive clock frequency for each color for the purpose of adjusting the scale in the paper feed direction during backside image creation when creating an image on the back side in duplex printing mode.

In response to the control signal produced from the CPU 101, the frequency divider circuit 108Y generates the yellow polygon clock signal by dividing the frequency of the reference clock signal produced from the crystal oscillator 104Y, and sends it to a polygon M in an exposure unit 1Y.

In response to the control signal produced from the CPU 101, the frequency divider circuit 108M generates the magenta polygon clock signal by dividing the frequency of the reference clock signal produced from the crystal oscillator 104M, and sends it to the polygon M in an exposure unit 1M.

In response to the control signal produced from the CPU 101, the frequency divider circuit 108C generates the cyan polygon clock signal by dividing the frequency of the reference clock signal produced from the crystal oscillator 104C, and sends it to the polygon M in an exposure unit 1C.

In response to the control signal produced from the CPU 101, the frequency divider circuit 108K generates the black polygon clock signal by dividing the frequency of the reference clock signal produced from the crystal oscillator 104M, and sends it to the polygon M in an exposure unit 1M.

Figure 5:
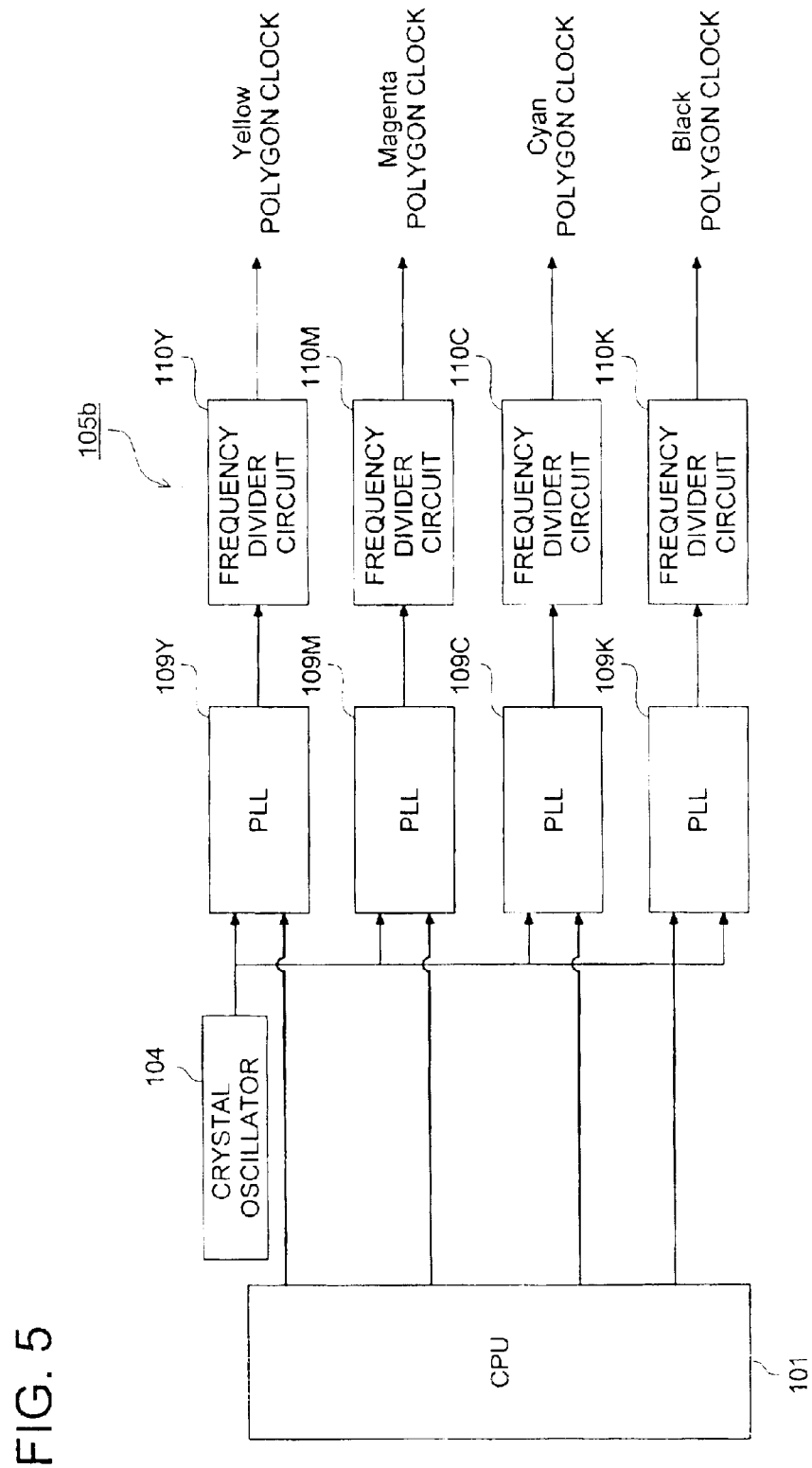
FIG. 5 is a clock diagram representing a polygon drive clock generation circuit 105b.

FIG. 5 shows the internal configuration of a polygon drive clock generation circuit 105b as an example of the polygon drive clock generation circuit 105 according to the present invention.

As shown in FIG. 5, the polygon drive clock generation circuit 105b comprises a crystal oscillator 104, PLLs (phase Locked Loops) 109Y, 109M, 109C and 109K, and frequency divider circuits 110Y, 110M, 110C and 110K.

In FIG. 5, the CPU 101 separately sets the frequency converted value at the PLLs 109Y, 109M, 109C and 109K, and products the control signals for instructing frequency conversion to send them to each of these PLLs separately. Especially, the CPU 101 changes the setting of frequency conversion values of each PLL in order to change the polygon drive clock frequency for each color for the purpose of adjusting the scale in the paper feed direction during backside image creation when creating an image on the back side in duplex printing mode.

In response to the control signal produced from the CPU 101, the PLL 109Y converts the frequency of the reference clock signal produced from the crystal oscillator 104 and sends the frequency-converted signal to the frequency divider circuit 110Y.

In response to the control signal produced from the CPU 101, the PLL 109M converts the frequency of the reference clock signal produced from the crystal oscillator 104 and sends the frequency-converted signal to the frequency divider circuit 110M.

In response to the control signal produced from the CPU 101, the PLL 109C converts the frequency of the reference clock signal produced from the crystal oscillator 104 and sends the frequency-converted signal to the frequency divider circuit 110C.

In response to the control signal produced from the CPU 101, the PLL 109K converts the frequency of the reference clock signal produced from the crystal oscillator 104 and sends the frequency-converted signal to the frequency divider circuit 110K.

The frequency divider circuit 110Y divides the frequency of the clock signal-sent from the PLL 109Y at a predetermined division ratio to generate the yellow polygon clock signal and sends it to the polygon M in the exposure unit 1Y.

The frequency divider circuit 110M divides the frequency of the clock signal sent from the PLL 109M at a predetermined division ratio to generate the magenta polygon clock signal and sends it to the polygon M in the exposure unit 1M.

The frequency divider circuit 110C divides the frequency of the clock signal sent from the PLL 109C at a predetermined division ratio to generate the cyan polygon clock signal and sends it to the polygon M in the exposure unit 1C.

The frequency divider circuit 110K divides the frequency of the clock signal sent from the PLL 109K at a predetermined division ratio to generate the black polygon clock signal and sends it to the polygon M in the exposure unit 1K.

Figure 6:
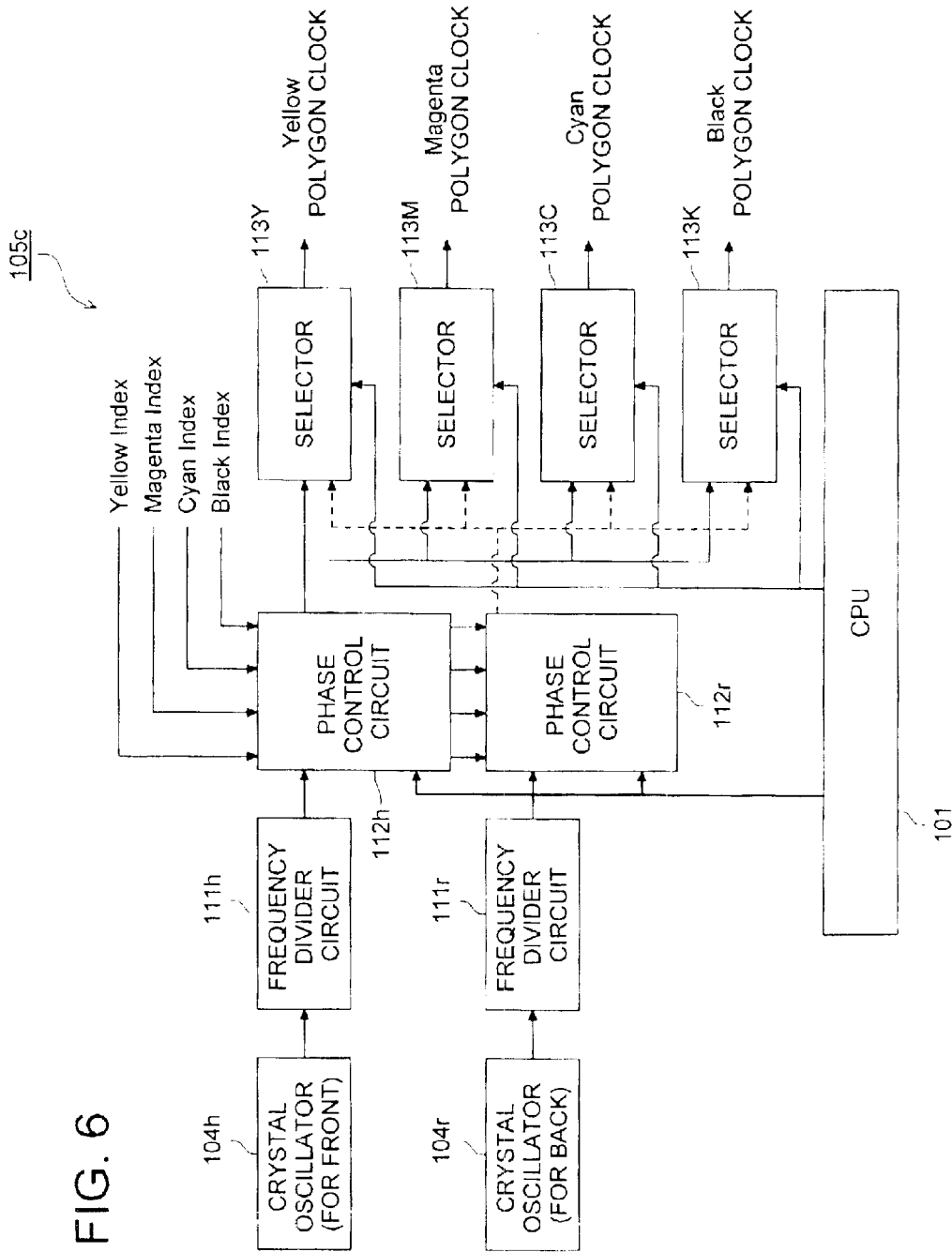
FIG. 6 is a clock diagram representing a polygon drive clock generation circuit 105c with consideration given to polygon drive clock signal phase control.

FIG. 6 shows the internal configuration of a polygon drive clock generation circuit 105c as an example of the polygon drive clock generation circuit 105 according to the present invention.

As shown in FIG. 6, the polygon drive clock generation circuit 105c comprises a crystal oscillator 104h for creating an image on the front side, a crystal oscillator 104r for creating an image on the back side, frequency divider circuits 111h and 111r, phase control circuits 112h and 112r, and selectors 113Y, 113M, 1113C and 113K.

In FIG. 6, the CPU 101 changes the settings of the division ratio in the frequency divider circuits 111h and 111r in order to change the polygon drive clock frequency for each color for the purpose of adjusting the scale in the paper feed direction during backside image creation when creating an image on the back side in duplex printing mode. The CPU 101 then sends the control signal for instructing frequency division at the preset division ration to these frequency divider circuits. Further, the CPU 101 sends to the phase control circuits 112h and 112r the control signal for instructing phase control of the clock signal that has been frequency-divided by the frequency divider circuit's 111h and 11, respectively. Further, the CPU 101 sends to the selectors 113Y, 113M, 113C and 113K the selection signal for selecting between the clock signal produced from the phase control circuit 112h for creating an image on the front side or the clock signal produced from the phase control circuit 112r for creating an image on the back side.

The frequency divider circuit 111h divides the frequency of the reference clock signal produced from the crystal oscillator 104h at the division ratio set by the CPU 101, and sends it to the phase control circuit 112h.

The frequency divider circuit 111r divides the frequency of the reference clock signal produced from the crystal oscillator 104r at the division ratio set by the CPU 101, and sends it to the phase control circuit 112r.

Phase control circuit 112h detects the phase difference between the index signal of the reference color, for instance, a black color, and the other index signal of another color, for instance, yellow color, among the index signals of the colors (Yellow Index and others) detected by index sensor 11. Then, phase control circuit 112h conducts phase control of the polygon clock signal to determine a phase of a polygon drive clock for another color, for example, for yellow against a polygon drive clock for a color representing a reference, for example, for a black color, based on the phase difference, and outputs controlled clock signal to a selector for the corresponding color.

Phase control circuit 112r detects the phase difference between the index signal of the reference color, for instance, a black color, and the other index signal of another color, for instance, yellow color, among the index signals of the colors (Yellow Index and others) detected by index sensor 11. Then, phase control circuit 112h conducts phase control of the polygon clock signal to determine a phase of a polygon drive clock for another color, for example, for yellow against a polygon drive clock for a color representing a reference, for example, for a black color, based on the phase difference, and outputs controlled clock signal to a selector for the corresponding color.

In response to the selection signal produced from the CPU 101, the selector 113Y selects either one of the clock signals produced from two phase control circuits 112h and 112r, and sends it to the polygon M in the exposure unit 1Y as a yellow polygon clock signal.

In response to the selection signal produced from the CPU 101, the selector 113M selects either one of the clock signals produced from two phase control circuits 112h and 112r, and sends it to the polygon M in the exposure unit 1M as a magenta polygon clock signal.

In response to the selection signal produced from the CPU 101, the selector 113C selects either one of the clock signals produced from two phase control circuits 112h and 112r, and sends it to the polygon M in the exposure unit 1C as a cyan polygon clock signal.

In response to the selection signal produced from the CPU 101, the selector 113K selects either one of the clock signals produced from two phase control circuits 112h and 112r, and sends it to the polygon M in the exposure unit 1K as a black polygon clock signal.

Figure 7:
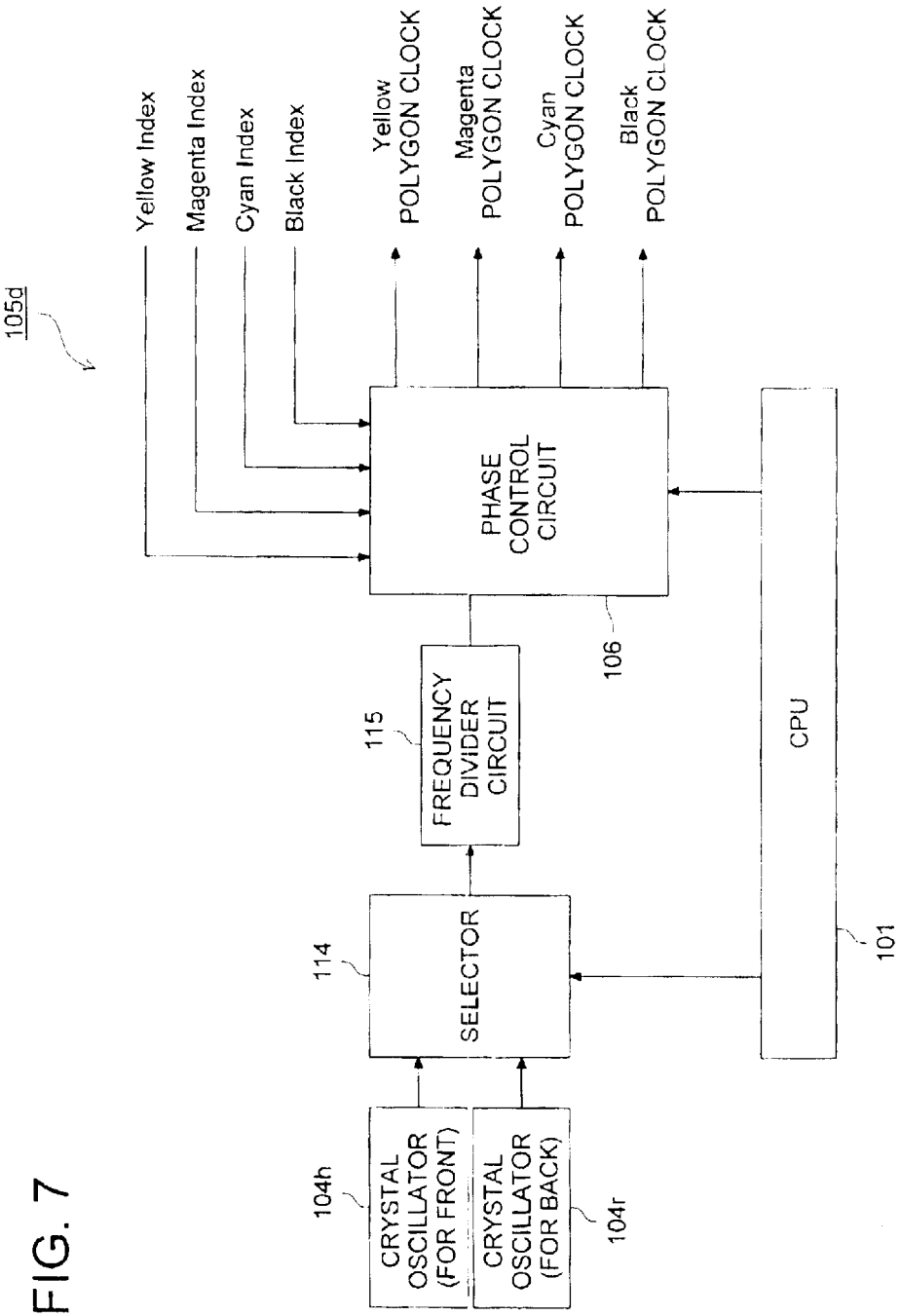
FIG. 7 is a clock diagram representing a polygon drive clock generation circuit 105d with consideration given to polygon drive clock signal phase control.
Figure 8:
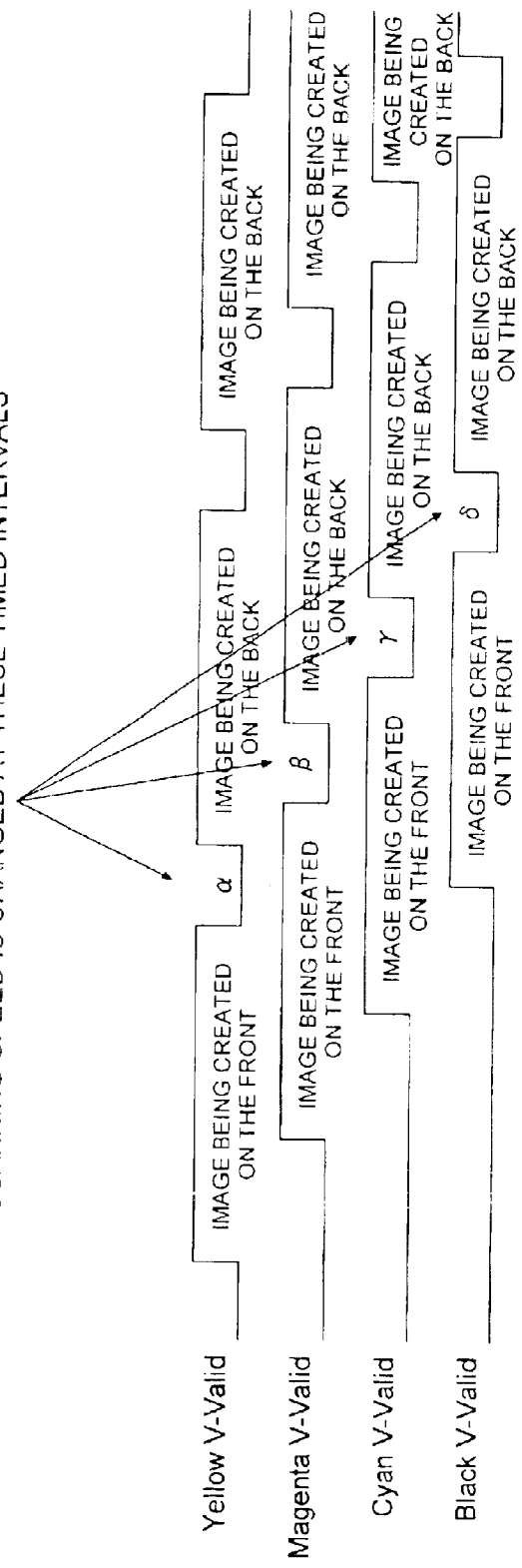
FIG. 8 is a timing chart representing timings of image formation on the front and back surfaces for each color.
Figure 9:
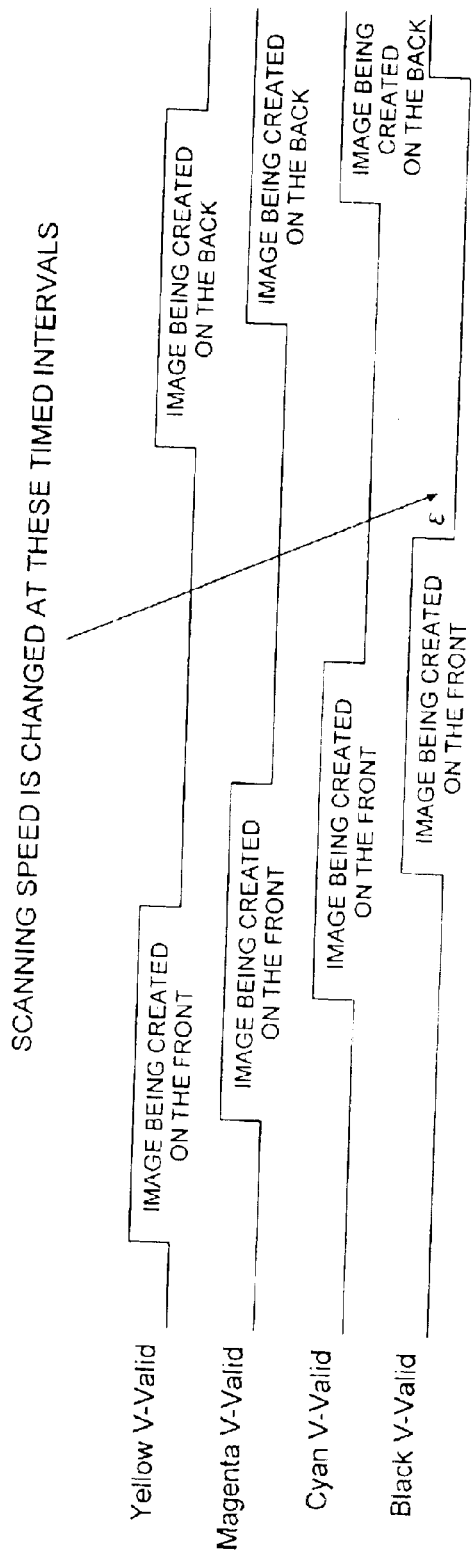
FIG. 9 is a timing chart representing timings of image formation on the front and back surfaces for each color.

FIG. 7 shows the internal configuration of a polygon drive clock generation circuit 105d as an example of the polygon drive clock generation circuit 105 according to the present invention.

As shown in FIG. 7, the polygon drive clock generation circuit 105d comprises a crystal oscillator 104h for creating an image on the front side, a crystal oscillator 104r for creating an image on the back side, a selector 114, a frequency divider circuit 115, and a phase control circuit 116.

In FIG. 7, the CPU 101 sends to the selector 114 the selection signal for selecting between the reference clock signal produced from the crystal oscillator 104h for creating an image on the front side and that produced from the crystal oscillator 104r for creating an image on the back side. The CPU 101 then changes the settings of the division ratio in the frequency divider circuit 115 in order to change the polygon drive clock frequency for each color for the purpose of adjusting the scale in the paper feed direction during backside image creation when creating an image on the back side in duplex printing mode. Then it sends the control signal for instructing frequency division at the preset division ration to the frequency divider circuit 115. Further, the CPU 101 sends to the phase control circuit 116 the control signal for instructing phase control of the clock signal that has been frequency-divided by the frequency divider circuit 115.

In response to the selection signal produced from the CPU 101, the selector 114 selects either one of the reference clock signals produced from two oscillators 104 and 104r, and sends it to the frequency divider circuit 115.

In response to the control signal produced from the CPU 101, the frequency divider circuit 115 divides the frequency of the reference clock signal produced from the crystal oscillator 104h or 104r at the preset division ratio, and sends it to the phase control circuit 116.

Phase control circuit 116 detects the phase difference between the index signal of the reference color, for instance, a black color, and the other index signal of another color, for instance, yellow color, among the index signals of the colors (Yellow Index and others) detected by index sensor 11. Then, phase control circuit 112h conducts phase control of the polygon clock signal to determine a phase of a polygon drive clock for another color, for example, for yellow against a polygon drive clock for a color representing a reference, for example, for a black color, based on the phase difference, and outputs controlled clock signal to a selector for the corresponding color.

Two signal sources for image formation on the front and back sides (crystal oscillator 104h and 104r) are arranged in FIG. 7. It is also possible to make arrangements in such a way that the frequency of the reference clock signal produced from one signal source is converted by two PLLs, and is divided by a frequency divider circuit, as shown in FIG. 5.

The following shows the operation of the present Embodiment:

First, the following describes the operation in the duplex printing mode where the polygon drive clock generation circuits 105a, 105b and 105c (hereinafter referred to as "105") is applied. It should be noted that the following explanation of the operation refers to the case where the recording paper P is shrunken by the step of fixing on the front side, as shown in FIG. 3.

When the duplex printing mode for a document g placed on the document tray of an automatic document feed apparatus 201 is specified by the operation of a key or touch panel on the image forming apparatus GH, the document g is fed by a feed means, and images on both sides of the document g are scanned and exposed by the optical system of a document image scanning/exposure apparatus 202. It is then read into a line image sensor CCD.

The read image is subjected to photoelectric conversion through the line image sensor CCD. The analog signal undergoing photoelectric conversion through the line image sensor CCD is decomposed into each of the colors Y, M, C and K by an image processor (not illustrated), and is stored into an image memory (not illustrated) as image data.

Based on the image clock signal produced from a horizontal synchronizing circuit, the PWM signal generation circuit 107 generates the PWM signal for driving the LD in response to the Y-color image data stored in the image memory.

Based on the PWM signal generated in a PWM signal generation circuit 107, the LD drive unit 12 in the exposure unit 1Y generates the drive signal for emitting a laser beam. According to the Y-color polygon clock signal generated by the polygon drive clock generation circuit 105, the polygon mirror of a polygon M13 is rotated, and the laser beam driven by the aforementioned drive signal is emitted to a photoreceptor drum 2Y for scanning.

A Y-color electrostatic latent image is formed on the photoreceptor drum 2Y by the scanning of laser beam emitted through the polygon mirror. The electrostatic latent image on the photoreceptor drum 2Y is developed by Y-color toner supplied from the developing device 3Y.

The same steps are taken in the exposure units 1M, 1C and 1K. Electrostatic latent images for magenta, cyan and black colors are formed on the photoreceptor drums 2M, 2C and 2K. These electrostatic latent images on the photoreceptor drums 2M, 2C and 2K are developed by toner of magenta, cyan and black colors.

Then a magenta toner image formed by an image forming unit 10M is transferred on a rotating intermediate transferring belt 20B and is superimposed on the yellow toner image that has already been transferred. Upon completion of magenta color transfer, the toner remaining on the peripheral surface of the photoreceptor drum 2M after transfer is removed by an image forming device cleaning means 4M. Then the next image formation cycle (image formation cycle for back side) is started.

Then a cyan toner image formed by the image forming unit 10C is transferred on the rotating intermediate transferring belt 20B and is superimposed on the yellow and magenta toner images that have already been transferred. Upon completion of cyan color transfer, the toner remaining on the peripheral surface of the photoreceptor drum 2C after transfer is removed by an image forming device cleaning means 4C. Then the next image formation cycle (image formation cycle for back side) is started.

Then a black toner image formed by the image forming unit 10K is transferred on the rotating intermediate transferring belt 20B and is superimposed on the yellow, magenta and cyan toner images that have already been transferred. Upon completion of the primary black color transfer, the toner remaining on the peripheral surface of the photoreceptor drum 2K after transfer is removed by an image forming device cleaning means 4K. Then the next image formation cycle (image formation cycle for back side) is started.

When the CPU 101 has determined that the image has been created on the front side by the image forming unit 10Y, the value obtained by multiplying the yellow polygon drive clock, frequency in the front side image creation mode by L/L' is set as a yellow polygon dive clock frequency in the back side image creation mode. Then the frequency control signal is sent to the polygon dive clock generation circuit 105. In response to the frequency control signal sent from the CPU 101, the polygon drive clock generation circuit 105 generates the yellow polygon clock signal for back side image creation, and this signal is sent to the polygon M13 in the exposure unit 1Y.

When polygon drive CLK generating circuit 105c shown in FIG. 6 is applied, polygon drive CLK of Y color controlled in terms of a phase is outputted based on the phase difference of the index signal between reference color K and Y color, on phase control circuit 112r for the reverse side use, and polygon drive CLK of the phase control circuit 112r is selected in selector section 113Y. Namely, polygon CLK signals for Y color, whose frequency and phase have been adjusted for the image forming operation on the reverse surface of the recording medium, are generated on polygon drive CLK generating circuit 105c.

In addition to the change in the setting of the yellow polygon drive frequency, the value obtained by multiplying the yellow pixel clock frequency in the front side image creation mode by (L/L'). (W/W') is set as a yellow pixel clock frequency in the back side image creation mode, and the frequency control signal is sent to the pixel clock generation circuit 103.

Based on the pixel cock signal with the frequency changed, the PWM signal generation circuit 107 generates the PWM signal in conformity to the yellow image data for back side stored in the image memory. The LD drive unit 12 in the exposure unit 1Y emits the laser beam based on the PWM signal generated by the PWM signal generation circuit 107. The polygon M13 rotates the polygon mirror based on the yellow polygon clock signal for back side image creation, and the aforementioned laser beam is emitted to the photoconductor 2Y for scanning.

Upon completion of image creation on the front side by the image forming units 10M, 10C and 10K, the settings of the polygon drive clock frequency and pixel clock frequency are changed for image creation on the back side, the image creation on the back side is started, and image creation on the back side is started, similarly to the case of image forming unit 10Y.

As described above, FIG. 8 shows the timing chart when the polygon drive clock generation circuits 105a,105b and 105c given in FIGS. 4 through 6 is applied. As shown in the timing chart of FIG. 8, frequency change and phase control of the polygon clock signals for various colors are carried out at the timed intervals α, β, γ and δ, respectively.

When the polygon drive clock generation circuit 105d of FIG. 7 is applied, phase control for back side is selected upon completion of the phase control of the polygon clock signal for front side image creation for all colors. Accordingly, timing for image formation on the front and back sides is determined as follows: The frequency and phase of the polygon clock signal and pixel clock frequency are changed at the timed interval ε upon completion of image creation on the front side for all colors (yellow, magenta, cyan and black), as shown in the timing chart of FIG. 9. Then the image creation on the back side is started.

As described above, for during back sided image creation in the duplex printing mode, the image forming apparatus GH as the present Embodiment changes the frequency of the polygon clock signal to adjust the scale in the paper feed direction (sub-scanning direction), and the frequency of the pixel clock signal to adjust the scale in the main scanning direction, thereby ensuring high precision registration between the front and back.

Further, the frequency of the polygon clock signal and frequency of the pixel clock signal are changed for each of the image creation units (image forming units 10Y, 10M, 10M and 10K) for various colors. As shown in the timing chart of FIG. 8, each image creation unit changes the polygon drive clock frequency and pixel clock frequency at the timed intervals α, β, γ and δ, respectively, upon completion of image creation on the front side, and then shifts to the step of image creation on the back side, thereby reducing the printing time.

The polygon drive clock generation circuit's 105c and 105d shown in FIGS. 6 and 7 provides phase control of the polygon clock signal based on the index signal for each color. This allows the write timing control of exposure units 1Y, 1M, 1C and 1K, and permits correction of color misregistration of not more than one pixel in the paper feed direction (sub-scanning direction), thereby enduring a high-precision color registration.

It should be noted that the present Embodiment is not restricted to the above description. Variations are possible as appropriate, without departing from the spirit of the present invention.

The present invention provides the following effects:

(1) The present invention allows frequencies of the pixel clock signal and polygon clock signal to be changed when image formation on one side of the recording paper is shifted to that on the other side, thereby ensuring excellent matching between the image size of the front side and that of the back side.

(2) The present invention allows the timings of forming images of various colors to be set separately between formation of an image on the front surface and that on the back surface. This prevents color misregistration from occurring in the traveling direction of paper.

(3) The present invention allows the frequency of pixel clock signals and that of polygon clock signals to be changed for each of the multi-color image creating units, whereby printing time is reduced.

(4) The present invention provides easy generation of a polygon clock signal corresponding to each of the image creating units.

(5) The present invention provides precision-precision correction of color misregistration since polygon clock signals corresponding to the image creating units are produced from one clock generation means.

(6) The prevent invention provides polygon signal phase control, thereby enabling correction of color misregistration of not more than one pixel in the paper feed direction.

Disclosed embodiment can be varied by a skilled person without departing from the spirit and scope of the invention.

What is claimed is:

1. An apparatus for forming a duplex image on a recording sheet, said duplex image including an obverse-side image formed on an obverse surface of said recording sheet and a reverse-side image formed on a reverse surface of said recording sheet, said apparatus comprising:

an image-forming section to form said obverse-side image and said reverse-side image on a photoreceptor element by scanning a light beam onto said photoreceptor element, wherein the light beam is modulated with image signals based on pixel-clock signals and reflected from a polygon mirror rotating at an operating velocity based on polygon-clock signals;

a transferring section to transfer said obverse-side image and said reverse-side image formed on said photoreceptor element onto said obverse surface and said reverse surface of said recording sheet, respectively;

a fixing section to fix said obverse-side image and said reverse-side image onto said obverse surface and said reverse surface of said recording sheet, respectively; and a clock-frequency changing section to automatically change (i) a pixel-clock frequency which is a frequency of said pixel-clock signals, and (ii) a polygon-clock frequency which is a frequency of said polygon-clock signals, in accordance with a degree of shrinkage of said recording sheet caused by a fixing operation performed in said fixing section, wherein the clock-frequency changing section changes the pixel-clock frequency and the polygon-clock frequency at a transition time which occurs at least one of: (i) after said image-forming section completes an image-forming operation for said obverse-side image and before said image-forming section commences an image-forming operation for said reverse-side image, and (ii) after said image-forming section completes an image-forming operation for said reverse side image and before said image forming section commences an image-forming operation for said obverse-side image.

2. The apparatus of claim 1, wherein said clock-frequency changing section determines a pixel-clock frequency changing-rate and a polygon-clock frequency changing-rate based on a first shrinkage rate of said recording sheet in a paper conveying direction.

3. The apparatus of claim 2, wherein said clock-frequency changing section determines said pixel-clock frequency changing-rate based on both said first shrinkage rate of said recording sheet in said paper conveying direction and a second shrinkage rate of said recording sheet in a main-scanning direction.

4. An apparatus for forming a duplex color image on a recording sheet, said duplex color image including an obverse-side color image formed on an obverse surface of said recording sheet and a reverse-side color image formed on a reverse surface of said recording sheet, said apparatus comprising:

a plurality of image-creating units, each of which corresponds to one of a plurality of colors and each of which forms a unicolor image by scanning a light beam to form said obverse-side color image and said reverse-side color image on a photoreceptor element, wherein the light beam is modulated with image signals based on pixel-clock signals and reflected from a polygon mirror rotating at an operating velocity based on polygon-clock signals;

a transferring section to transfer said obverse-side color image and said reverse-side color image formed on said photoreceptor element onto said obverse surface and said reverse surface of said recording sheet, respectively;

a fixing section to fix said obverse-side color image and said reverse-side color image onto said obverse surface and said reverse surface of said recording sheet, respectively; and a clock-frequency changing section to automatically change (i) a pixel-clock frequency for each of said plurality of image-creating units which is a frequency of said pixel-clock signals, and (ii) a polygon-clock frequency for each of said plurality of image-creating units which is a frequency of said polygon-clock signals, in accordance with a degree of shrinkage of said recording sheet caused by a fixing operation performed in said fixing section, wherein the clock-frequency changing section changes the pixel-clock frequency and the polygon-clock frequency at a transition time which occurs at least one of: (i) after said plurality of image-creating units complete image-forming operations for said obverse-side color image before said plurality of image-creating units commence image-forming operations for said reverse-side color image, and (ii) after said image-forming section completes image-forming operations for said reverse-side color image and before said image forming section commences image-forming operations for said obverse-side color image.

5. The apparatus of claim 4, wherein said clock-frequency changing section determines a pixel-clock frequency changing-rate and a polygon-clock frequency changing-rate based on a first shrinkage rate of said recording sheet in a paper conveying direction.

6. The apparatus of claim 5, wherein said clock-frequency changing section further determines said pixel-clock frequency changing-rate based on both said first shrinkage rate of said recording sheet in said paper conveying direction and a second shrinkage rate of said recording sheet in a main-scanning direction.

7. The apparatus of claim 5, further comprising a setting section to set timings for separately forming each said unicolor image separately between a first phase for forming said obverse-side color image and a second phase for forming said reverse-side color image, based on said pixel-clock frequency changing-rate and said polygon-clock frequency changing-rate determined by said clock-frequency changing section.

8. The apparatus of claim 4, wherein said clock-frequency changing section changes said pixel-clock frequency and said polygon-clock frequency separately for each of said plurality of image-creating units.

9. The apparatus of claim 4, wherein each of said polygon-clock signals, corresponding to each of said plurality of image-creating units, is generated from a corresponding one of a plurality of independent clock generating sources.

10. The apparatus of claim 4, further comprising a multi-clock generating section to generate a plurality of clock signals, each of which is independently employed for a corresponding one of said plurality of image-creating units, from a clock signal outputted by a single clock generating source;

wherein each of said polygon-clock signals, corresponding to each of said plurality of image-creating units, is generated from one of said plurality of clock signals generated by said multi-clock generating section.

11. The apparatus of claim 4, further comprising:

a reference signal detecting section to detect main-scanning reference signals in main-scanning paths of each said light beam; and a phase controlling section to control a phase of said polygon-clock signals, based on a phase difference between a first one of said main-scanning reference signals of a reference color and a second one said main-scanning reference signals of another color, so as to determine a phase of said polygon-clock signals corresponding to said second main-scanning reference signal of the other color.

12. The apparatus of claim 11, wherein said phase controlling section independently performs a first operation for controlling said phase of said polygon-clock signals employed for forming said obverse-side color image on said obverse surface of said recording sheet, and a second operation for controlling said phase of said polygon-clock signals employed for forming said reverse-side color image on said reverse surface of said recording sheet; and wherein said phase controlling section at least one of: (i) changes said first operation to said second operation every time said first operation for each said unicolor image is completed, and (ii) changes said second operation to said first operation every time said second operation for each said unicolor image is completed.

13. The apparatus of claim 11, wherein said phase controlling section independently performs a first operation for controlling said phase of said polygon-clock signals employed for forming said obverse-side color image on said obverse surface of said recording sheet, and a second operation for controlling said phase of said polygon-clock signals employed for forming said reverse-side color image on said reverse surface of said recording sheet;

and wherein said phase controlling section at least one of (i) changes said first operation to said second operation when said first operation for all unicolor images is completed, and (ii) changes said second operation to said first operation when said second operation for all said unicolor images is completed.

* * * * *